United States Patent [19]

Musgrove

[11] 3,944,170
[45] Mar. 16, 1976

[54] APPARATUS FOR PRODUCING PIVOTAL MOVEMENT
[75] Inventor: Robert G. Musgrove, Arlington, Tex.
[73] Assignee: LTV Aerospace Corporation, Dallas, Tex.
[22] Filed: June 20, 1974
[21] Appl. No.: 481,290

[52] U.S. Cl. ................... 244/44; 74/86; 244/42 D; 416/23
[51] Int. Cl. ............................................. B64c 3/48
[58] Field of Search .. 244/44, 42 D, 42 DA, 42 DB, 244/34, 75 R; 416/23, 240; 74/86

[56] References Cited
UNITED STATES PATENTS

| | | | |
|---|---|---|---|
| 1,868,748 | 7/1932 | Hogan | 244/44 |
| 2,451,009 | 10/1948 | Williams et al. | 244/42 DB |
| 3,109,613 | 11/1963 | Bryant et al. | 244/44 |
| 3,687,374 | 8/1972 | Nash | 239/265.35 |

*Primary Examiner*—Trygve M. Blix
*Assistant Examiner*—Barry L. Kelmachter
*Attorney, Agent, or Firm*—James M. Cate; H. C. Goldwire

[57] ABSTRACT

An apparatus for causing relative movement of first and second structures about a pivot axis is disclosed wherein a rotatable, elongated member has first and second portions which respectively extend from the pivot axis toward the first and second structures. The second portion of the member extends rotatably within a housing which is also rotatable with respect to the second structure. The axis of rotation of the member second portion within the housing is skewed from the axis or rotation of its first portion relative to the first structure by an angle θ and is also skewed by an equal angle from the axis of rotation of the housing relative to the second structure. Simultaneous rotation of the housing and member in opposite rotational directions produces arcuate movement of the member first portion and the first structure, about the pivot axis, relative to the second structure.

9 Claims, 15 Drawing Figures

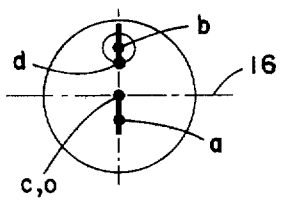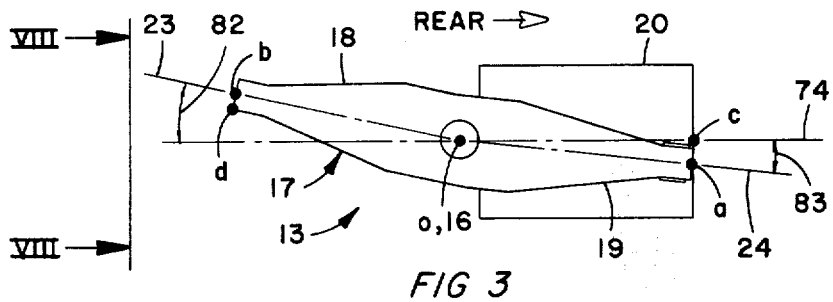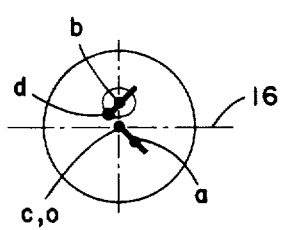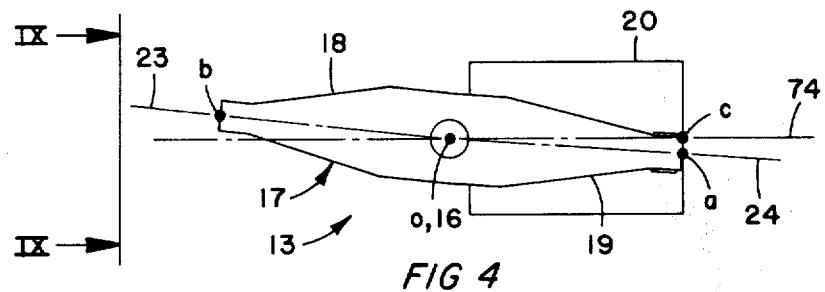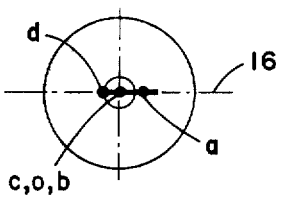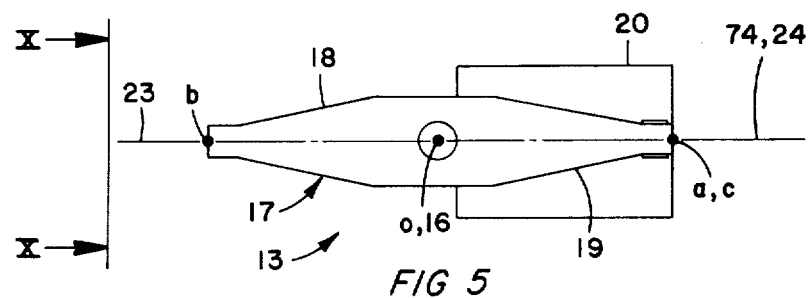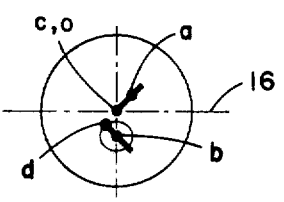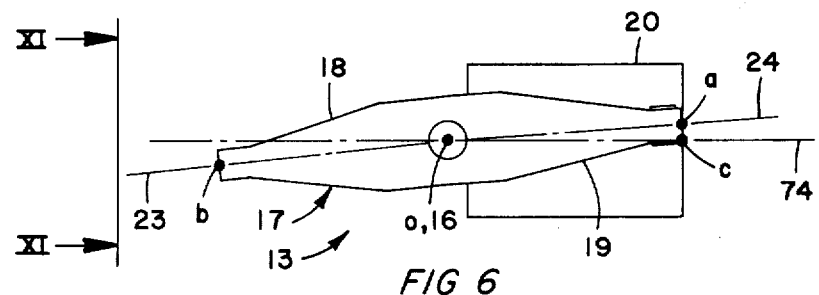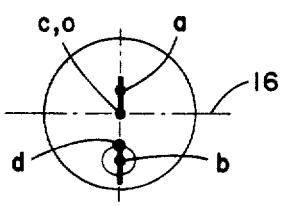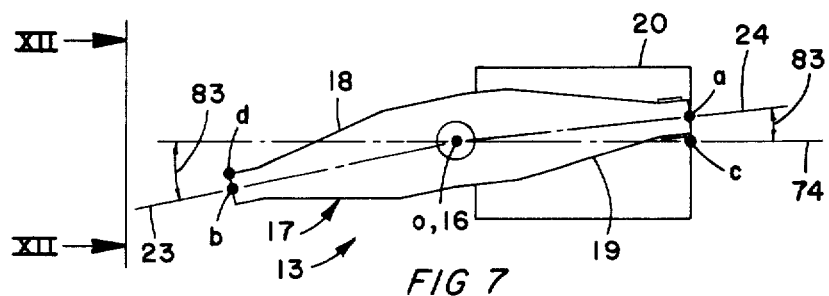

APPARATUS FOR PRODUCING PIVOTAL MOVEMENT

This invention relates to apparatus for causing relative pivotal movement of two structures and, more particularly, to such apparatus operable for causing controlled, relative pivotal movement of two adjacent segments of an airfoil.

While a variety of fairly straightforward mechanisms can be employed for inducing relative pivotal movement between two structures, such mechanisms often are not suitable when it is desired to impart a precisely controlled degree of relative pivotal movement, particularly when there may be other forces acting upon the structures which oppose the controlled movement or which impose forces upon the structures tending to induce movement independently of the control signal. Accordingly, when a control mechanism for positioning relatively movable structures must additionally be capable of bearing a substantial load, further structural considerations are entailed. Such design considerations may be of little consequence in the case of mechanisms not required to meet particular standards of minimum weight and size, in that sufficiently large, conventional gearing and actuating devices may then be employed. When weight, size, and actuating power must be restricted, however, quite serious difficulties may arise in providing such a control mechanism which is precisely operable, yet capable of maintaining pivotal structures in a selected relative position despite the occurrence of severe external forces or loads.

The problem is particularly acute in the case of movable aircraft components, such as flaps, trim devices and the like, which are pivotally related to fixed portions of an aircraft. Mechanisms for pivotally moving and positioning such airfoil members must be capable of precisely controlled operation, while at the same time meeting stringent requirements as to weight and size. At the same time, such mechanisms may continuously support the weight of horizontally extending, movable airfoils when the aircraft is on the ground, and must be capable of resisting severe loads in either pivotal direction during flight, the loads being dependent upon the angle of attack of the plane and upon the position of the movable airfoil. In flight, these loads are usually greatest when the airfoil is in its extreme pivotal positions, particularly in the upper extreme of pivotal movement. It can be readily appreciated that the problems discussed thus far with respect to the positioning of a single airfoil or flap relative to an airfoil are even more serious in the case of variable camber airfoils or the like having two or more movable segments serially connected, each of which must be pivoted in a controlled manner with respect to a respective, adjacent segment. Such variable camber, or variable geometry, airfoils are known to be capable of providing significant aerodynamic advantages over conventional airfoils having only one movable element adjacent a leading and/or trailing edge portion of the airfoil. However, their application has been limited because of the above-discussed problems concerning the practical implementation of actuating and control mechanisms capable of bearing cumulative loads imposed upon the airfoil segments (the loads being greater in magnitude, in some instances, than the entire weight of the aircraft), yet meeting reasonable standards of weight, size and preciseness of operation.

Historically, early aircraft employed cables, actuated by the pilot's controls, extending externally of the wings and fuselage for transmitting control forces to the movable control surface elements. For positioning a movable, horizontally extending airfoil, for example, one such cable was fastened to a lever or moment arm extending generally upwardly from the airfoil at a location adjacent the hinge axis, and a second cable was fastened to another lever arm extending downwardly from the movable airfoil, again at a location adjacent to the pivot axis. The reason the moment arms were extended from the airfoil was to increase their length and thus reduce the actuating force required. The mechanical advantage was necessary to permit positioning of the control surfaces by the pilot in spite of opposing loads, and to permit such control safely and reliably with the materials and engineering techniques available at the time. As the art developed, single, longitudinally rigid, push rods were substituted for the two control cables of early aircraft. In modern aircraft, a push rod or its equivalent may be employed as a part of the actuation system, but the push rod and associated apparatus through which actuating force is applied are mounted internally of the fuselage and wing to reduce drag. Suitable gearing and/or fluidly powered actuating mechanisms are employed to drive the movable component, and electrically transmitted signals may be employed to control remote servo systems operatively connected to the actuating mechanism. It will be understood by those in the art that even in modern, servo controlled systems wherein no lever or moment arm connected to the movable airfoil component is employed, and wherein driving forces are applied through hydraulic or electrically powered actuating mechanisms operating through gears or racks rotatable with the movable airfoil, a moment arm nevertheless exists through the rotatable gear or rack to a driving gear or rack in the movable airfoil or structure engaged with the gear and operable to transmit force thereto and to the movable airfoil.

In modern aircraft, wherein such actuating mechanisms are installed within the external skin of the airfoil to reduce drag, the length of the moment arm through which actuating forces are applied is generally limited by the local thickness of the airfoil if the moment arm extends vertically (or, more generally, perpendicularly of the major plane of the airfoil if vertically extending airfoils are considered). This limitation thus results in a corresponding requirement, for efficient, reliable operation, of gearing and driving mechanisms of undesirably high load capacity, adding to the weight and bulk of the actuating system. If it is attempted to transmit such control forces through rotatable, spanwise drive shafts to avoid such problems, new difficulties arise related to the added weight of such shafts and the necessity of torsional rigidity thereof. If, on the other hand, the moment arm is extended horizontally or chordwise within the fixed airfoil segment and made longer to reduce the required driving force, its vertical pivotal movement is also limited by the local thickness of the airfoil, and only a small range of pivotal movement is possible. Again, these problems are even more serious when the control mechanisms are employed to position the plurality of segments required in variable camber airfoils and the like. The difficulties are further manifold in the case of transonic or supersonic aircraft wherein the airfoils are of relatively thin, flat configuration during high-speed flight, but are preferably cambered substantially for take-off or landing and for low-speed flight.

In the past, some multi-segment, variable camber airfoils have employed a plurality of push rods connected to and extending serially between vertical levers or moment arms fastened to the airfoil segments, a technique which suffers from the above-stated problems concerning weight, size, and power vs. moment arm requirements. Generally, such techniques have not been practical in modern airfoils of limited thickness. Another approach, which is more closely analogous to the control mechanism of the present invention, has involved the use of "bent links" extending generally chordwise within the fixed airfoil segment and within a relatively movable airfoil segment, each link being rotatable about a chordwise axis from which a portion thereof extends angularly. As the link is caused to rotate about the chordwise axis, the canted, distal end portion of the link passes through a circular path coaxial of the axis and thus moves angularly with respect to the pivot axis of the relatively movable airfoil component as well as in a spanwise direction. A suitable track or the like has thus been required in the movable airfoil segment for slideably or movably receiving the distal end of the link to permit generally spanwise movement thereof relative to the movable airfoil while transmitting angular movement of the link about the pivot axis of the wing to the movable airfoil, resulting in the desired pivotal movement of the movable component about its pivot axis.

These "bent link" mechanisms have not been generally accepted in the art, however, because of the difficulties involved in accurately mating the bent links within the associated tracks, because of frictional inefficiencies entailed in moving the link elements along the associated tracks, and because there is inherent in such an arrangement a degree of play between the links and the tracks which makes the wing structure susceptible to possibly dangerous vibration during flight. It is, of course, of vital importance that any such actuating and control apparatus be capable of highly reliable operation during extending service, and that consideration be taken of all possible environmentally or aerodynamically induced hazards, such as resonant vibration of the airfoil during high-speed or turbulent flight.

It is, accordingly, a major object of the present invention to provide a new and improved apparatus for causing relative pivotal movement of first and second structures.

Another object is to provide such an apparatus capable of effecting precisely controlled, relative pivotal movement of two structures while at the same time bearing substantial loads received from the structures.

Yet another object is to provide such a control apparatus which is particularly adapted for use in pivotally connecting, and controlling the relative position of, two adjacent segments of an airfoil.

Another major object is to provide such a position control apparatus in which the moment arm through actuating force is transmitted from one to another of two relatively movable airfoil segments extends in a generally chordwise direction within the airfoil.

A further object is to provide such a control apparatus employing a rotatable link having first and second relatively skewed portions for imparting angular movement to an airfoil segment relative to a second segment, but wherein no corresponding track or groove structure is required in either of the relatively pivotable structures for accommodating spanwise movement of a portion of the rotatable link.

A still further object is to provide such a control apparatus which is efficiently operable, in series arrangement, for effecting gradual camber of an airfoil having a plurality of contiguous airfoil segments.

Another object is to provide a control apparatus having such a rotatable link, incorporating an actuator for rotatably driving the link, which is adapted to provide an appropriate moment of force to a pivotable airfoil segment upon the application of only a relatively small degree of driving force to the rotatable link, whereby an efficient transmission of driving force to the airfoil segment is obtained.

A related object is to provide a control apparatus inherently providing a substantial amount of mechanical reduction, whereby the need for an additional, braking-coupling device to lock the relatively movable airfoil structures in place is obviated.

A still further object is to provide such a control apparatus which, when a movable airfoil segment in positioned by the control apparatus is either of two extremes within a range of pivotal movement and in which the airfoil segment may receive aerodynamic forces urging it toward a medial position within the range, transmits none of the aerodynamic force to the associated actuator.

Yet another object is to provide such a control mechanism in which the mutually adjacent segments of an airfoil are rigidly supported by the control mechanism in a desired position upon cessation of rotation of the mechanism, whereby potentially hazardous vibrations of the airfoil segments is minimized, and further, whereby the segments of a multi-segment airfoil can be rigidly connected and efficiently controlled.

Still another object is to provide a control apparatus providing the above-stated advantages which, nevertheless, is of practicable, rugged construction, employing only a few movable parts, whereby rigorous standards of reliability can be met at reasonable cost.

Other objects and advantages will be apparent from the specification and claims and from the accompanying drawing illustrative of the invention.

In the drawing:

FIGS. 3–7 are diagrammatic representations showing the major axes of the linkage structure, taken in the same plane as FIG. 2 and showing the linkage structure in five successive, rotational positions;

FIGS. 8–12 are diagrammatic representations taken as on lines VIII—VIII, IX—IX, X—X, XI—XI, and XII—XII, respectively, of FIGS. 3–7, respectively;

Figure 1:
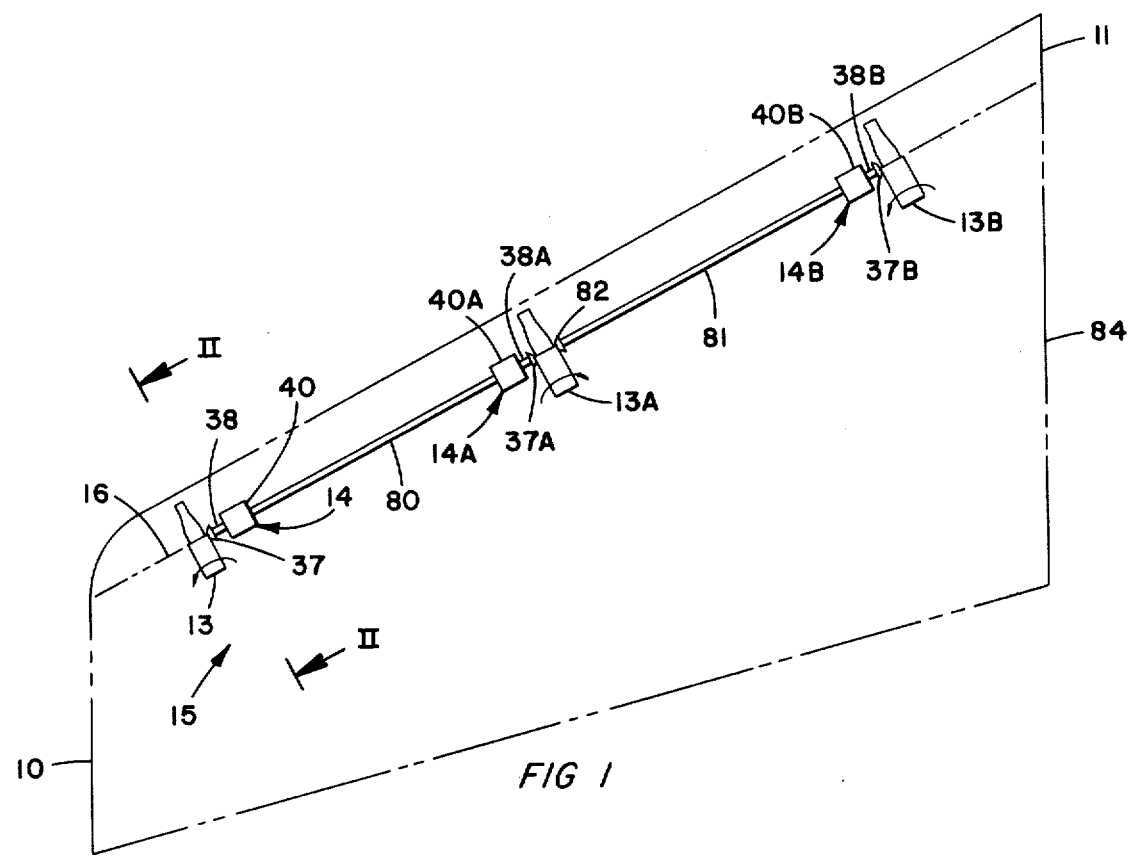
FIG. 1 is a plan view of an aircraft wing having a forwardly extending, relatively movable airfoil segment or leading edge flap which is pivotally connected to the wing by three control mechanisms constructed according to one embodiment of the present invention, the wing and flap being shown in broken, phantom lines.

With initial reference to FIG. 1, an aircraft wing 10 and an associated, forward flap 11 are connected by three linkage structures 13 constructed according to a preferred embodiment of the present invention. The linkage structures 13 are associated with drive mechanisms 14, as will be described in detail hereinafter, and comprises in combination therewith a control apparatus or mechanism 15 for causing relative pivotal movement of the forward flap 11 and wing 10 about a hinge line or pivot axis 16 extending spanwise along the junction of the flap and the wing, as in conventional airfoil structures. The flap 11 may be considered a first relatively pivotable structure or airfoil segment, and the wing 10 a second structure or segment. For clarity of description, directional terminology such as "upward," "downward," "forward" and "rearward" will be used herein with reference to the exemplary aircraft wing 10 and forward flap 11 of the illustrated embodiment. It should be understood, of course, that such terminology is not to be taken as limiting the scope of the invention to the particular embodiment chosen for illustration, and that the control apparatus has utility in various aerospace and non-aerospace applications wherein it is desired to effect controlled, relative pivotal movement of at least two structures.

With additional reference to FIG. 2, the linkage structure 13 includes an elongated member 17 having a first portion 18 extending generally chordwise within the flap 11 and a second portion 19 extending within the wing structure 10 and received therein by a housing 20 rotatably mounted within the wing, and to be described hereinbelow. For structural rigidity, the elongated member 17 is suitably of double-ended spindle configuration, with the first and second portions 18 and 19 tapering outwardly toward their respective distal end portions, and the member is suitably of hollow construction for minimizing weight. The first and second member portions 18 and 19 extend along respective axes 23 and 24 and, in the present embodiment, are axisymmetrically configured with respect to their respective axes. As can be most clearly seen in FIG. 2, the axis 23 of the member first portion is skewed from the axis 24 of the member second portion 19 by an angle θ which is less than 90 degrees, and which is approximately 4 degrees in the illustrated embodiment.

A first bearing 25 is provided for rotatably journalling the distal, reduced diameter end section of the first portion 18 of the member 17 within a corresponding bore formed through a first support or frame member 26, which may suitably be a span or other structural portion of the flap 11, or a vertical plate or the like rigidly mounted within the flap. The first bearing, in the present embodiment, consists of an annular, teflon lined sleeve fitted circumferentially around the adjacent member portion 18 and seated within the associated bore through the frame member 26. The first bearing 25 has a circumferential, radially projecting lip portion 27 fitting against the rear surface of the frame member 26, and an annular, teflon bearing 28 is seated against the opposite side of the frame member 26 circumferentially of the member first portion 18. A corresponding, radially projecting lip 30 is formed circumferentially of the member second portion 18 for axially and slideably bearing against the bearing lip portion 27. An externally threaded portion 31 of the member first portion is provided extending slightly beyond the first frame member 26 for receiving a nut 32 suitably bearing against a washer 33 seated between the nut 32 and the washer bearing 28, whereby the member 17 is constrained against axial movement relative to the flap 11 but is permitted to rotate therein. A second bearing 34, suitably a second, annular, teflon lined sleeve, is similarly seated within a corresponding, annular opening formed through a second frame member 35 of the flap 11 spaced between the first frame member 26 and the wing 10, the second bearing 34 serving to rotatably journal the member first portion 18 within the second frame member 35. The first and second bearings 25, 34 thus comprise a first bearing means for permitting rotational movement of the member 17 about the axis 23 of the member first portion 18 and preventing yaw or pitch of the member 17 relative to the flap 11, i.e., providing moment transfer capability between the member 17 and the flap 11.

Teflon lined, sleeve bearings such as the bearings 25, 34 are advantageously used in the present embodiment because of their light weight, but other bearing constructions, such as ball or roller bearing assemblies (not shown) are suitably employed in alternative embodiments. In other applications of the control mechanism 15, the bearing elements may comprise slideably mating surfaces of the member 17 itself and the frame members 26, 35. For example, the member first portion 18 may be provided with smoothly finished, external surfaces, not shown, which are adapted to bear slideably directly against adjacent, corresponding annular seats defined by adjacent, associated structures such as frame members 26 and 35, a lubrication agent preferably being provided therebetween, for permitting rotation of the member 17 within the frame members 26 and 35.

Referring again specifically to FIGS. 1 and 2, the member first portion 18 is provided with a radially projecting portion defining a first beveled gear 36, of mitre configuration, extending circumferentially and coaxially around the member first portion adjacent the second bearing 34 and positioned between the second bearing and the wing 10. The first bevel gear 36 is engaged with a corresponding bevel gear 37, termed hereinafter, the actuating gear 37, which is coaxially mounted upon a spanwise drive shaft or axle 38. As seen most clearly in FIG. 1, the drive shaft of axle 38 extends from an actuator 40, to be described, in a spanwise direction to the linkage structure 13 and is oriented in coaxial alignment with the pivot axis 16. The axle 38, actuator 40 and associated gearing thus comprise a drive mechanism 14. The actuating gear 37 is mounted for rotation upon the pivot axis 16 of the flap 11.

The member second portion 19 extends and is journalled within the housing 20 upon other bearings (61 and 75), which will be described in greater detail in a later section. The housing 20 is hollow, defining a chamber 44 open toward the pivot axis 16 for receiving the member second portion 19. The housing 20 is suitably of generally cylindrical configuration, having a first end portion 45 journalled within a third bearing 46 and a second end portion 47, adjacent the actuating gear 37, journalled within a fourth bearing 48. The housing 20 extends rearwardly within the wing 10 from the actuating gear 37 in a generally chordwise direction, the third and fourth bearings 46, 48 being seated within corresponding, mutually coaxial, annular openings formed through first and second frame members 50 and 51 seated within the wing 10. (More specifically, the housing 20 extends perpendicularly of the forward edge of the wing 10.) The second end portion 47 of the housing 20 is provided, at its forward portion, with a coaxial, bevel gear 52, termed hereinafter the second bevel gear 52, corresponding in tooth structure to the first bevel gear 36 and also engaged with the actuating gear 37. The fourth bearing 48 is provided with a circumferential lip 53 projecting radially alongside the wing second frame member 51 and between the frame member 51 and the second bevel gear 52 for maintaining the second bevel gear in engagement with the actuating gear 37. At its opposite, first end portion 45, the housing 20 is provided with an externally threaded end section 54 extending rearwardly within the wing 10 beyond the wing first frame member 50, and a corresponding nut 55 is threadingly engaged with the threaded portion against a washer 56 and a washer-shaped, annular bearing element 57, suitably teflon lined, disposed between the washer 56 and the wing first frame member 50; this arrangement permits rotational movement of the housing 20, nut 55, and washer 56 within the third and fourth bearings 46 and 48. The nut 55 thus serves to prevent forward axial movement of the housing 20 relative to the wing 10 and maintains the rear surface of the annular lip defining the second bevel gear 52 in sliding contact with the lip 53 of the fourth bearing 48, whereby the second bevel gear 52 is maintained in engagement with the actuating gear 37. As is common in aircraft construction, the nut 55 is preferably locked against rotation by a shear pin or the like, not shown.

The first end portion 45 of the housing 20 has a planar wall 58 extending transversely of the housing and suitably aligned with the first frame member 50 of the wing 10, and a generally cylindrical socket 60 is formed in and projects rearwardly from the rear side of the transverse wall 58, and is open forwardly toward the pivot axis 16 for receiving a fifth bearing 61 and the rear end of the elongated member second portion 19. The member second portion 19 has a circumferential, radially projecting lip 62 preferably extending outwardly beyond the inner diameter of the housing socket 60 adjacent the fifth bearing 61, the fifth bearing having a sleeve portion 63 seated within the socket 60 and a circumferential lip 64 projecting radially outwardly beyond the inner diameter of the socket 60 and slideably contacting the lip 62 of the second member portion 19.

The socket 60 has a circular, transversely extending endwall 65 with an opening 66 formed coaxially therethrough and of smaller diameter than the sleeve portion 63 of the fifth bearing 61. The member second portion 19 has a rearwardly projecting, central boss 67 coaxial of the member second portion 18 and which extends through the socket opening 66, the bearing lip 64 being of a sufficient thickness to space the rear wall of the member second portion 19 a small distance from the socket transverse wall 65, as shown at 68. The boss 67 has a threaded bore 70 formed axially therethrough, and a corresponding bolt 71 is threadingly engaged within the bore 70, a washer 72 being provided beneath the head of the bolt 71 and extending radially alongside the transverse wall 65 of the socket 60. A teflon lined bearing element 73 or washer is seated between the washer 72 and the transverse socket wall 65.

The fifth bearing 61 and the planar bearing element 73 thus permit axial rotation of the member second portion 19 within the socket 60, while the bolt 71 and the washer 72 serve to constrain the member second portion 19 within the socket 60, preventing axial translation of the member 17 within the housing 20. The thickness of bearings 64 and 73 is selected to provide proper adjustment of gears 36 and 52 with respect to the actuation gear 37, and the spacing may be conveniently varied by substituting bearings of different thicknesses.

The third and fourth bearings 46, 48 are positioned, by the associated, supporting, wing frame members 50, 51 in coaxial alignment upon an axis intersecting the pivot axis 16. The third and fourth bearings 46, 48 thus permit axial rotation of the axisymmetrical housing 20 about an axis 74 intersecting the pivot axis 16, and preferably perpendicular to the pivot axis.

A sixth, sleeve bearing 75 similar to the second bearing 34 is seated within an inner, annular surface of the housing 20 adjacent the housing second end portion 47. An inwardly projecting, annular lip 76 is formed on the housing second end portion 47 for seating the sixth bearing 75. The fifth and sixth bearings 61 and 75 are coaxially aligned on an axis intersecting the pivot axis 16, and they and the housing 20 are positioned to constrain the member 17 with the axis 24 of the member second portion 19 intersecting the pivot axis 16 at the point of mutual intersection of the axes 23 and 24 of the first and second member portions 18 and 19. To achieve continuous, mutual alignment, at the pivot axis 16, between the axis 74 of the housing 20, the pivot axis 16, and the juncture of the axes 23, 24 of the member first and second portions 18, 19, the axis 24 upon which the fifth and sixth bearings 61 and 75 are aligned is canted or skewed, about the pivot axis 16, from the rotational axis 74 of the housing 20 by an angle equal to the angle $\theta$ by which the axis 23 of the first member portion 18 is skewed from the axis 24 of the second member portion 19. The fifth and sixth bearings 61 and 75, in cooperation with the adjacent, supporting structure of the housing 20, thus comprise a third bearing means for permitting rotation of the member 17 within the housing chamber 44 upon the axis 24 of the member second portion 19 and for preventing yaw or pitch of the member 17 relative to the housing 20, i.e., for providing moment restraint between the member 17 and housing 20, the rotational axis of the member 17 within the housing 20 thus being canted from the rotational axis 74 of the housing 20 within the wing 10 by the angle $\theta$. The third and fourth bearings 46 and 48, in cooperation with the associated, supporting structure such as the frame members 50 and 51, thus comprise a second bearing means for permitting rotation of the housing 20 within the wing 10 about an axis 74 intersecting the pivot axis 16 at its intersection with the axes 23, 24 of the member first and second portions 18, 19 and for preventing yaw or pitch of the housing 20, relative to the wing 10, from the housing rotational axis.

With primary reference now to FIG. 1, it has been preferred in the present embodiment, in which three linkage structures 13, 13A and 13B are mutually spaced along the hinge line 16, to employ drive mechanisms 14, 14A, and 14B including actuators 40, 40A, 40B which are adjacent and drivingly connected to respective ones of the linkage structures 13, 13A, and 13B, the linkage structures 13A and 13B being identical to the linkage structure 13 described above with reference to FIG. 2. The actuators 40, 40A, and 40B may comprise electrical or hydraulic motors or the like powered by remotely located control apparatus, not shown, as are known in the art. In one embodiment, for example, the actuators 40, 40A, and 40B suitably are hydraulic motors of the type manufactured by the Sperry Vickers Division of the Sperry Rand Corporation, under Model No. MF-3907-30, combined with gear reduction units providing a speed reduction of about 800:1. The actuators 40, 40A and 40B are operable to rotate the shafts 38, 38A, and 38B, through selected angular increments, in either rotational direction. To provide fail-safe operation in the event of a failure of one of the actuators 40, 40A, and 40B, their driving mechanisms are preferably interconnected. Thus, a shaft 80, extending along the hinge axis 16, is connected between the rotating elements of the actuators 40 and 40A. Similarly, a second shaft 81 is connected between the actuator 40B and a bevel gear 82 engaged with the linkage structure 13A in the manner described previously with respect to the actuating gear 37 of the linkage structure 13.

Figure 2:
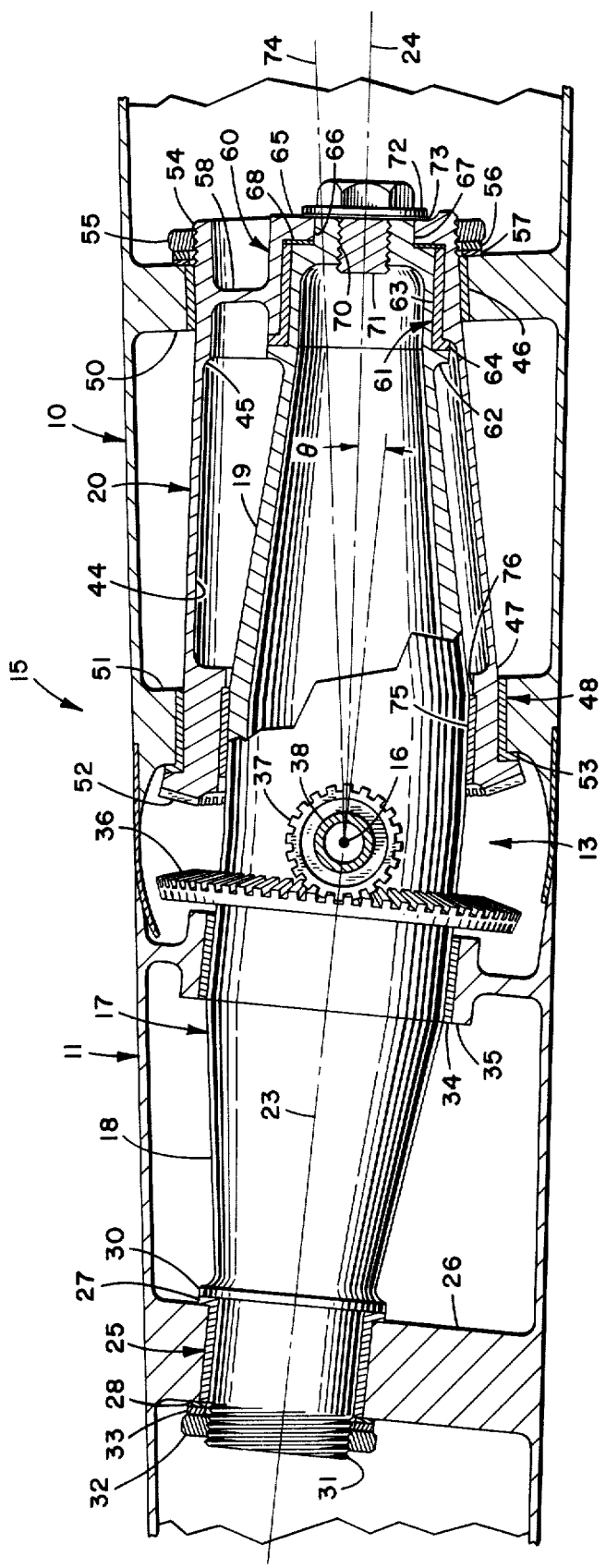
FIG. 2 is a longitudinal, partially sectional view, taken as on line II—II of FIG. 1 but on a relatively enlarged scale, of the rotatable, elongated member and the associated housing, portions thereof being broken away for clarity, and of associated portions of the wing and leading edge flap.

Referring now to FIG. 2, because the first and second bevel gears 36 and 52 each have an equal number of teeth, and because each is continuously constrained in engagement with the actuating gear 37 during all operating positions, rotation of the actuating gear by the actuator 40 will effect rotation of the member 17 upon the first bearing means (comprising the first and second bearings 25, 34) in a first rotational direction while causing rotation of the housing 20, upon the second bearing means (comprising the third and fourth bearings 46, 48), in a second, opposite rotational direction. The actuator 40, shaft 38, actuating gear 37, and corresponding bevel gears 36, 52 of the linkage structure 13A and 13B thus comprise a means for rotating the member 17 upon the first bearing means and for simultaneously rotating the housing 20 upon the second bearing means at an equal rotational velocity but in an opposite direction.

With additional reference now to FIGS. 3–12, the operation of the linkage structure 13 in response to rotation of the actuating gear 37 (FIG. 2) will now be described.

In FIGS. 3–12, the wing 10, flap 11, and actuating mechanisms are omitted for clarity, and the housing 20 and member 17 are shown only in diagrammatic form. Reference points $a$, $b$, $c$, and $d$ denote respective locations on the member 17 and the housing 20, as described in the following paragraph; and, as in FIG. 2, axes 23 and 24 represent the central longitudinal axes at the first and second portions 18, 19 of the member 17, and axis 74 represents the central axis and the axis of rotation of the housing 20.

Reference point $a$ represents the intersection of the axis 24 of the member second portion 19 with the forward end surface of the member second portion 19, point $b$ the intersection of axis 23 with the rear end surface of the member first portion 18, point $c$ the intersection of axis 74 with a plane perpendicular thereto coincident with the rearmost surface of the housing 20, point $o$ the common intersection of axes 23, 24, and 74, and point $d$ a location on the rear end surface adjacent point $b$ but spaced downwardly therefrom and lying in the plane common to axes 23 and 24.

As seen in FIGS. 3 and 8, the member 17 and housing 20 are oriented with the axes 23, 24 of the first and second member portions 18, 19 and the rotational axis 74 of the housing 20 in a single plane, corresponding to the surface of the drawing in FIG. 3, when the member first end 18 is in its uppermost extreme of arcuate movement about the pivot axis 16, as will now be described.

When the member first end portion 18 is in its uppermost positional extreme, as shown in FIGS. 2, 3, and 8, the angle 82 (FIG. 3) between the central axis 74 of the housing 20 and the axis 23 of the member first portion 18 is $2\theta°$, and the angle 83 between the axis 74 and the axis 24 of the member second portion 19 is $\theta°$, as has been previously discussed with respect to FIG. 2. Assume now that the actuating gear 37 (FIG. 2) is rotated in a counterclockwise direction as viewed in FIG. 2, driving the adjacent, engaged portion of the first bevel gear 36 downwardly and driving the adjacent, engaged portion of the second bevel gear 52 upwardly. This induces rotation of the housing 20 within the third and fourth bearings 46, 48 in a counterclockwise direction, as viewed in FIG. 8, equal and opposite simultaneous rotation of the member 17 within the first and second bearings 25, 34 with respect to the forward flap 11, and rotation of the member within the fifth and sixth bearing 61 and 75 with respect to the oppositely rotating housing 20. Rotation of the housing 20 and member 17 through respective arcs of 45° results in the configuration of FIGS. 4 and 9. The housing 20 has rotated within its bearings, as shown by the line $c$, $o - a$ of FIG. 9, but has not been translated from its original orientation with respect to the fixed wing 10 (FIG. 2). Because of the equal and opposite rotation of the member 17, however, and as indicated by the line $d - b$ of FIG. 9, the point $b$ remains in the same vertical plane, in vertical alignment with $c$ and $o$. Thus, the central axis 23 of the member first portion 18 has rotated or pivoted directly downwardly about the pivot axis 16, while remaining in a vertical plane coincident with the axes 24 and 74. This is because the angle $\theta$ by which the member axis 23 is skewed from axis 24 is equal to the angle by which the central axis of the fifth and sixth bearings 61, 75 is canted from the rotational axis of the housing 20. As the rotation of the member 17 and housing 20 continues, the axis 23 of the member first portion 18 continues to pivot downwardly about the pivot axis 16. Reference point $b$ is coincident with the axis 74 after 90° of rotation of the housing 20, as shown in FIGS. 5 and 10, and below it after 135° of rotation as shown in FIGS. 6 and 11. After 180° of rotation of the housing (and 180° of oppositely directioned rotation of the member 17) the member first portion 18 reaches its lowermost extreme of pivotal movement about pivot axis 16 as shown in FIGS. 7 and 9, the axis 23 still remaining in a plane perpendicular to the pivot axis 16 and defining an angle 83 of $2\theta$ degrees with the central axis 74. Thus, the member first portion 18 passes through an angle equal to $4\theta$, or twice angle 83, during 180° of rotation of the housing 20 and member 17. Accordingly, the forward flap 11 is also pivoted about the axis 16 through an angle of $4\theta°$.

In the present, exemplary application as illustrated in FIG. 1, the movable components of each of the linkage structures 13, 13A, and 13B are initially oriented as has been described with reference to FIG. 2 and with respect to the housing 20 and member 17 of the first linkage structure 13. Because the second and third actuating gears 37A and 37B are each positioned, relative to the respective, associated linkage structures 13A and 13B, on sides which are opposite that on which the first actuating gear 37 is positioned relative to the first linkage structure 13, the second and third actuators 40A and 40B must be operable to rotate the second and third actuator gears 37A and 37B in a direction opposite to that in which the first actuator gear 37 is rotated. The three linkage structures 13, 13A, and 13B then operate in concert to effect pivotal movement of the forward flap 11 about the pivot axis 16. The interconnecting shafts 80 and 81 serve to precisely synchronize the pivotal movements of the three linkage structures 13, 13A, 13B, and, in the event of a failure of one of the actuators 40, 40A, and 40B, the shafts 80, 81 serve as a safety factor, driving the rotatable portions of the respective actuators 40, 40A, or 40B to operate the respective, associated linkage structure 13, 13A, or 13B.

The above-described operation of the linkage structures 13, 13A, 13B is thus effective to pivot the leading edge flap 11 from a horizontal orientation (FIGS. 2, 3, and 8) which is the uppermost extreme of pivotal movement of the flap 11, to a downwardly deflected position (FIGS. 7 and 12) which occurs when the flap 11 and member firsts portion 18 reach the lowermost extreme of pivotal movement. If it is alternatively desired to pivot the relatively movable element (11) between a downwardly deflected position and through a horizontal position to an upwardly deflected position, as is required generally for trailing flaps, the member first portion 18 is alternatively installed with its central axis 23 extending parallel to the chordline of the movable element rather than extending along an upward slope as has been shown in FIG. 2. That is, bearings, not shown, corresponding to the first and second bearings 25, 34 are installed along an axis parallel to the chordline of the flap rather than along an upwardly sloped axis. In such an application, the member 17 and housing 20 are positioned in the orientation illustrated in FIGS. 5 and 10 to achieve a horizontal orientation of the flap, are rotated to the orientation of FIGS. 3 and 8 to achieve an extreme, upward deflection, and to the orientation of FIGS. 7 and 12 to achieve a downward deflection. In the embodiment of FIG. 2, the wing 10 and flap 11 are provided with overlapping lip portions 85, 86 and 87, 88 at their adjoining edge portions for minimizing discontinuity between the contiguous airfoil skin surfaces.

Advantageous features of the apparatus 15 are discussed more fully in a later section. However, it is here noted that no loads are imparted to the actuators 40, 40A, 40B or the gearing 37, 37A, 37B when the member first portion 18 is in its uppermost or lowermost positional extreme. That is, aerodynamic loads upon the movable airfoil structure 11 are not then imparted to the actuators 40, 40A, 40B, since the member first portion 18 is centered in alignment with the housing axis 74.

It will be understood by those in the art that various modifications of the above-described embodiment are possible without departing from the scope of the appended claims. Thus, in other applications it may be desirable to position the actuating motors 40 internally of the aircraft fuselage and impart driving forces to the linkage structures by one or a series of rotatable drive shafts. The arrangement of FIG. 1 is generally preferred for larger wing structures, or for structures subjected to high loads, because of the difficulties involved in transmitting forces for a substantial distance through a wing by means of such drive shafts or by means of cables, push rods, or the like. In other, less critical applications, it is preferable to employ only one of the apparatus for causing relative pivotal movement (15). In such an application, the linkage 13 of the apparatus for causing pivotal movement 15 is spaced along the hinge line 16 from at least one other means pivotally connecting the flap 11 and the wing 10, and which in that case comprises at least one conventional hinge mechanism, not show, for maintaining the flap 11 in pivotal alignment with the forward edge of the wing 10. In another application, the vertical plane of movement of the member first portion 18 may not be perpendicular to the pivot axis 16. It is possible for the linkage structures 13, 13A, and 13B to be directioned parallel to the major axis of the aircraft fuselage 84, for example, rather than perpendicular to the swept hinge line 16. In this case, however, mutually slidable fittings or the like, such as telescoping fittings, not shown, must be provided for accommodating axial, chordwise movement of the end portions of the elongated member 17 within the relatively movable structures (10, 11) which is produced during operation.

Figure 13:
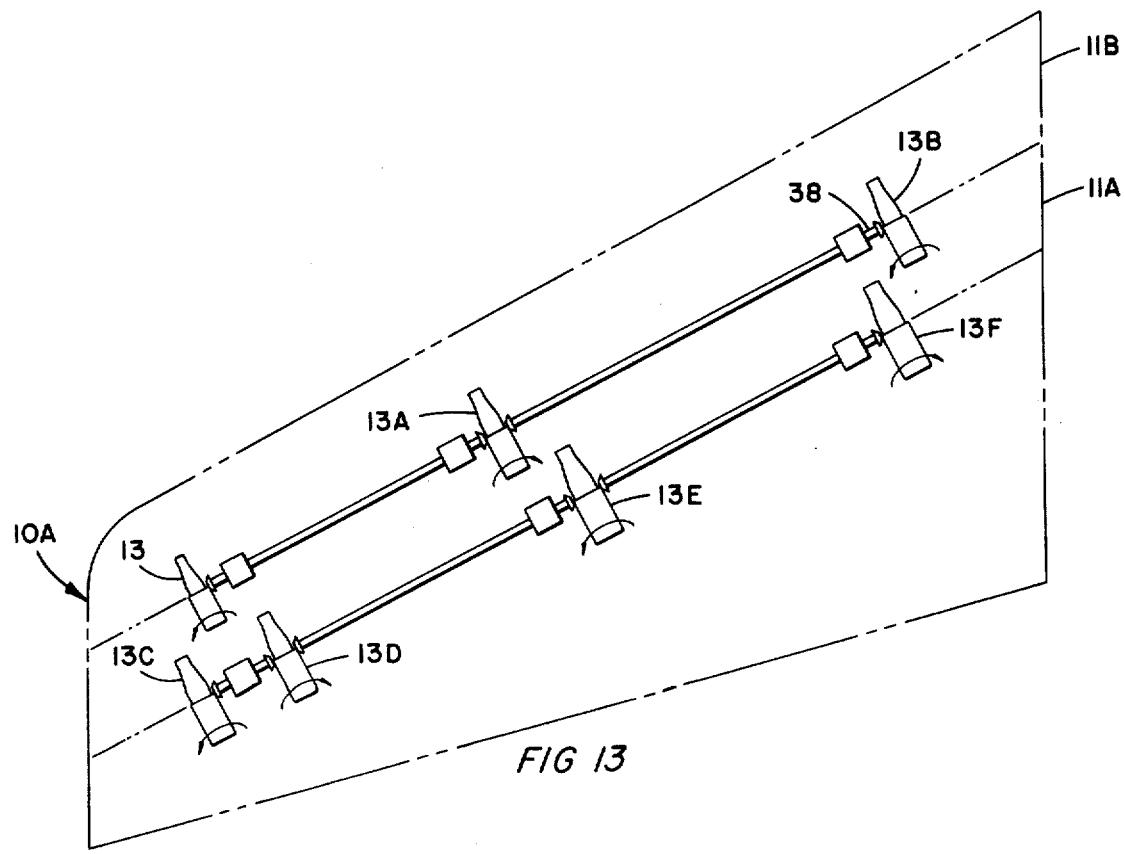
FIG. 13 is a view, similar to FIG. 1, showing a variable camber wing structure having three relatively movable airfoil segments interconnected by six of the linkage structures.

As shown in FIG. 13, the linkage structures are also suitably employed in series with additional, similar linkage structures such as those shown as 13C, 13D, 13E, and 13F, for effecting gradual, cumulative camber to an airfoil 10A employing more than one movable airfoil segment (11A, 11B). In this case, linkage structures 13C, 13D, 13E, and 13F are connected to impart pivotal movement to the intermediate segment 11A, and linkage structures 13, 13A, and 13B are connected to impart additional, simultaneous pivotal movement to the leading segment 11B with respect to the intermediate segment 11A, thus producing an increased, substantial degree of total camber to the airfoil 10A. This latter arrangement has utility in STOL aircraft and the like wherein large portions of the wings are cambered for landing and take-off, but wherein it is then desired to eliminate the camber during high-speed flight.

While the discussion thus far has been primarily of applications of the apparatus 15 to the positioning of leading edge flaps, the apparatus is alternatively employed to effect relative pivotal movement between an airfoil and a trailing flap or series thereof, not shown, instead of or in addition to the leading flaps. In such an application for the control of rear flaps, it is preferable that the housing 20 and second portion 19 of the elongated member 17 be installed in a rear portion of the airfoil and that the first member 18 extend rearwardly within the adjacent, trailing flap. As has been discussed previously, the orientation described with respect to FIGS. 5 and 10 then would correspond to the relatively horizontal position of the movable structure or flap.

It will be understood by those in the art that the apparatus 15 may also be employed for causing controlled, relative pivotal movement of structures other than adjacent airfoil segments, such as relatively movable, external components of spacecraft, or other servo controlled mechanisms.

While the linkage structure 13 has thus far been described with respect to an application in which it extends within portions of mutually adjacent elements or segments, the linkage structure 13 is also suitably installed externally of the relatively movable segments. For example, if it is desired to mount the linkage structure external of and below the wing 10 and flap 11, the support structures 50, 51, or their equivalents, are suitably extended downwardly (not shown) from the wing 10 for supporting the housing 20 below the wing, and the support structures 26, 35 are extended downwardly from the flap 18 for receiving the member first portion 18.

From the foregoing description, it can now be understood that the invention provides an effective means for causing controlled, relative pivotal movement between two structures. Because the bevel gears extend for a substantial distance around the periphery of the member 17 and housing 20, a substantial speed reduction is obtained between the smaller, actuating gear 37 and the gears of the member 17 and housing 20. Moreover, an additioned, substantial mechanical reduction is inherent in the operation of the linkage structure as will be understood from the above description with reference to FIGS. 3–12. In the present embodiment, for example, rotation of the elongated member 17 and housing 20 through respective arcs of 180° produces arcuate movement about the pivot axis 16 of only $4\theta°$, a substantial reduction; the reduction is even greater as the structures approach the upper and lower extremes of pivotal movement. Consequently, the loads on the adjacent gearing is greatly reduced, and they may therefore be made smaller and lighter; a relatively small actuating motor 40 may be employed, without substantial gear reduction, to reliably control the relative position of the movable structures 10, 11 in spite of the large aerodynamic loads which they receive in flight. Furthermore, because of the large mechanical advantage thus provided, bearing and gearing friction is normally suffcient to hold the movable airfoil structures in position, as in worm drive gearing, and thus prevent feedback of aerodynamic loads to the actuators and eliminate the need for an additional, braking-coupling device to lock the movable airfoil structure in place. This is an additional cost and maintenance advantage, in that such braking-coupling devices are often complex, expensive, and subject to malfunctions. A further advantage of this inherent gear reduction is that any "slop" in the gearing is reduced by the amount of the gear reduction before being transmitted to the airfoil segments. This is of particular advantage in multi-segmented airfoils.

Moreover, as has been previously suggested, the actuator motor 40 and associated driving mechanism 38, 37 receive no aerodynamic loads when the flap 11 is in its uppermost or lowermost extreme because of the vertical orientation of the axis 23 of the member first portion 18. This is advantageous, in that the greatest aerodynamic loads received by such flaps normally occur during their extremes of pivotal movement. In the case of a leading edge flap for a supersonic aircraft, sustained, high speed flight normally occurs when the flap is positioned horizontally, and the actuator 40 receives no deleterious stresses from the flap during such flight.

It will be further noted that the problems previously discussed concerning the limitations present in prior-art systems with respect to the length and orientation of the moment arms through which forces are applied to the airfoil segments have been effectively avoided in the present invention. That is, the moment arms through which actuating forces are applied, i.e., the extension of axis 23 between the first and second bearings 25, 34 and the extension of axis 74 between the third and fourth bearings 46, 48, extend generally chordwise within the airfoil structures 10, 11 yet the apparatus produces a total pivotal movement of $4\theta°$, or about twice the movement which is achieved by conventional airfoil control structures in which a chordwise lever arm is merely pivoted upwardly and downwardly about the pivot axis 16 within a wing segment. Accordingly, the moment arms may be extended for substantial distances within the airfoil segments 10, 11, providing superior rigidity and strength to the wing structure, yet produce a degree of pivotal movement normally impossible with horizontal lever arms of the same length. This increase in the lengths of the moment arms reduces the loads upon the supporting bearings, and the construction and dimensional tolerances of the bearings and supporting structures may be less precise.

The apparatus 15 also avoids the problems related to the mounting of prior-art, "bent link" or lever actuators in which arcuate, spanwise movement of the distal end of the rotatable, bent link is necessarily accommodated by a fitting slidably mounted in a track or groove extending arcuately within the movable airfoil segment. In the present apparatus, all the movable elements are mounted within corresponding bearings which are securely and nontranslatably seated within the associated airfoil segments. Therefore, the problems previously discussed concerning vibration resulting from slop between such bent links and their arcuate tracks are avoided.

Finally, while the apparatus is effective in providing the abovedescribed advantages over the prior art, it is, nevertheless, of rugged, practicable construction, employing few movable parts, and is thus well suited for use in applications entailing rigorous standards of reliability and performance.

Because of the rugged construction, the minimizing of any free play and resulting vibration between adjacent airfoil segments, and the chordwise orientation of its moment arms, the apparatus 15 is particularly suited for use in series arrangement in variable camber airfoils employing a plurality of relatively movable segments. It is generally known that such multi-segment airfoils are capable of providing significant aerodynamic advantages over conventional airfoils employing, for example, only leading and trailing flaps. It is known, for example, that airfoils in which large portions thereof to the rear of the fixed portion are cambered for improving lift at low speeds and for landing and take-off can provide significantly better performance than a wing in which a trailing flap of the same surface area is employed. This is because of the well-known problem of boundary layer separation adjacent and to the rear of the pivotal axis of the flap, which phenomenon can become a serious and possibly critical factor as the angle of deflection increases and as the airspeed drops. Multisegment wings in which a gradual camber can be imparted to a large portion of the chord length are capable of retaining satisfactory boundary layer flow at lower speeds and with higher degrees of camber, thus making them particularly desirable in STOL aircraft or the like in which high-speed operation is desired, with conventional wing configuration, combined with the activity to land and take off on short landing strips at low velocities with a highly cambered wing configuration. Such variable camber airfoils are also of important utility in transonic airfoils in which the forward and aft regions are gradually cambered to successive, predetermined configurations which produce optional performance at respective airspeeds approaching the speed of sound. During supersonic flight, such airfoils are preferably transformed into a thin, substantially flat cross-sectional configuration for reducing drag.

While it has long been recognized that such variable contour airfoils have the potential of providing significant improvements in aerodynamic performance, their actual use, particularly in high-speed aircraft, has been somewhat limited, largely because of the structural problems involved in applying cumulative camber to successive, interconnected airfoil segments. These problems have been suggested in the foregoing materials, and include those relating to the difficulty of retaining structural strength and rigidity throughout a series of interconnected segments, and the difficulties invloved in transmitting driving forces through such a variable geometry structure to the respective linkages. A further major problem has been that of the added weight of such structures, particularly when they must be made capable of sustaining substantial loads.

Structural approaches that have been suggested in the past for imparting gradual camber have included that exemplified by the early U.S. Pat. No. 1,190,378 to Clark, in which actuating forces are transmitted from one airfoil segment to the next by means of successive cables extending chordwise within the airfoil, and that represented by U.S. Pat. No. 3,109,613 in which a series of rotatable, bent links are connected in series and rotated in unison. The former approach suffers from the previously discussed problems inherent in the use of vertically extending moment arms in an airfoil.

Figure 14:
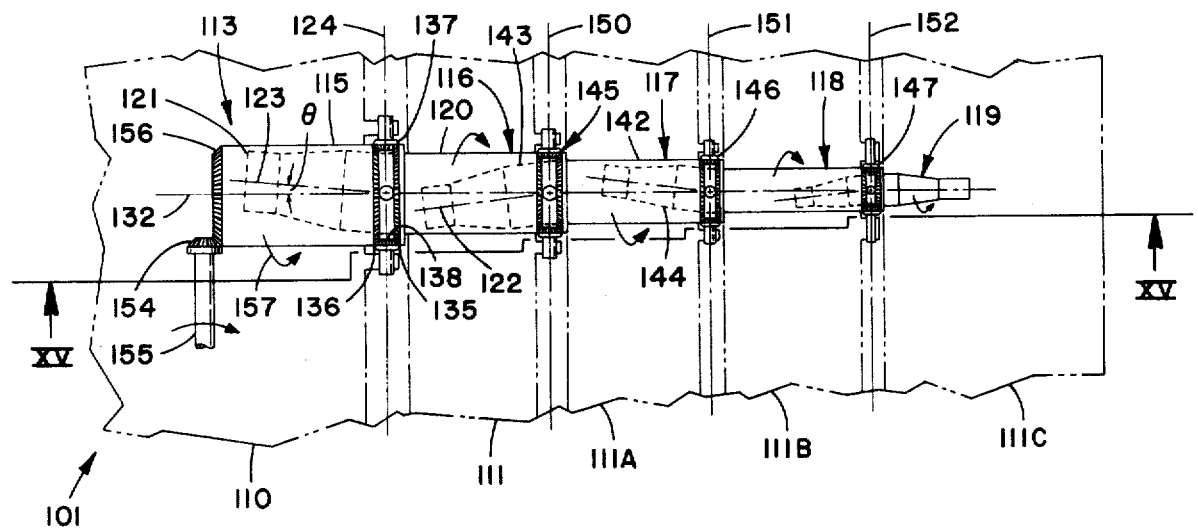
FIG. 14 is a top plan view of a further modification of the linkage structure showing a plurality thereof employed in series in a linkage for positioning a plurality of relatively pivotable airfoil segments, the segments being shown in broken, phantom lines for clarity.
Figure 15:
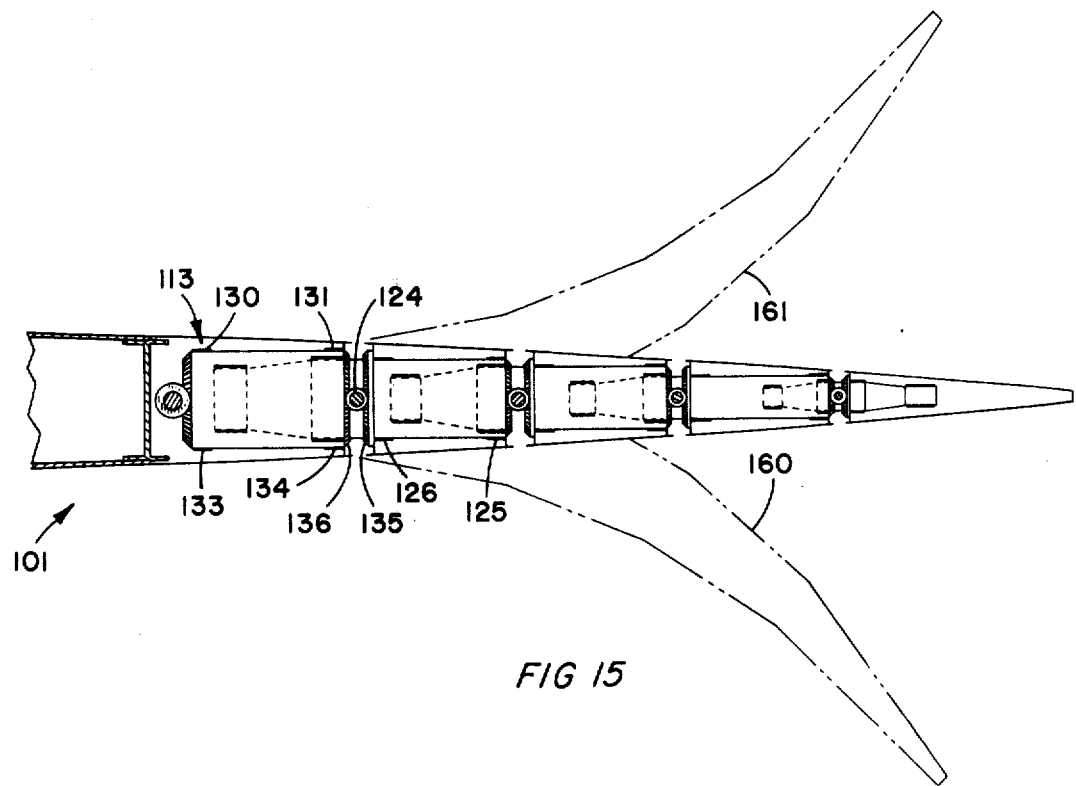
FIG. 15 is a side view of the linkage of FIG. 15.

With reference now to FIGS. 14 and 15, a further modification of the linkage structure is advantageously employed for inducing gradual camber to an airfoil 101 having a plurality of relatively movable spanwise segments, including first, second, third, and fourth segments 111, 111A, 111B, and 111C to the rear of the fixed portion 110 of the airfoil and comprising a tapering, rear portion of the airfoil 101. Referring to FIG. 15, the linkage 113 comprises first, second, third, fourth, and fifth linkage elements 115, 116, 117, 118, and 119, which are mounted rotatably in the airfoil fixed portion 110 and the first, second, third, and fourth segments 111, 111A, 111B, and 111C, respectively. Considering initially only the first and second linkage elements 115 and 116, it will be seen that these elements are functionally equivalent to the housing 20 and elongated member 17, respectively, of the linkage structure 13 previously described with reference to FIGS. 2 and 3–12. The second element 116 has a first portion 120 extending generally chordwise and rearwardly within the first airfoil segment 111 and a second portion 121 skewed from the first by an angle $\theta$ and extending forwardly within a corresponding chamber formed in the first linkage element 115. The first and second portions 120, 121 of the second linkage element 116 extend along respective axes which are mutually skewed by an angle $\theta$ and which intersect at a location coincident with a spanwise pivot axis 124 between the airfoil portion 110 and the first airfoil segment 111. The first portion 120 of the second linkage element 116 is rotatably mounted within the first airfoil segment 111 by means of first and second circumferential bearings 125 and 126 which correspond structurally and functionally to the first and second bearings 25 and 34 of the linkage structure 13 of FIG. 2, and thus permit rotation of the second element 116 within the first airfoil segment 111 about the axis 122 (FIG. 14) of the segment first portion 120. Similarly, third and fourth bearing elements 130, 131 are provided for permitting rotation, about its longitudinal axis 132, of the first linkage element 115 within the fixed airfoil portion 110, the longitudinal axis 132 being aligned continuously with the pivot axis 124 at its intersection with the axes 122, 123 during axial rotation of the linkage element 115. Fifth and sixth bearing elements 133, 134 journal the second portion 121 of the second element 116 within the first element 115 for permitting rotation of the second element 116 about the axis 123 of its second portion 121; bearings 133, 134 thus correspond to the fifth and sixth bearings 61, 75 of FIG. 2. A first bevel gear 135 facing forwardly is circumferentially formed on the second element 116 immediately to the rear of the hinge line 124, and a second, rearwardly facing bevel gear 136, corresponding to the second bevel gear 52 of the housing 20 of the structure of FIG. 2, is formed circumferentially of the rear portion of the first element 115. Referring primarily to FIG. 14, the first and second bevel gears 135, 136 are engaged with first and second, beveled connecting gears 137, 138 which are rotatably journalled within corresponding, adjacent supports 140, 141 extending rearwardly from the airfoil fixed portion 110, for rotation about respective horizontal axes coincident with the pivot axis 124, the supports 140, 141 being positioned on opposite sides of the bevel gears 137, 138. The connecting gears 137, 138, in the present embodiment, are free to rotate about their axes while remaining in engagement with the bevel gears 135, 136. As was the case with the structure 13 of FIG. 2, the first and second linkage elements 115, 116 are thus engaged, by the connecting gear 136, 137, in such a manner that any rotation of the first element 115 in a first rotational direction produces an equal amount of rotation of the second element 116 in the opposite direction. As in the linkage structure 13 of FIG. 2, simultaneous rotation of the two elements 115, 116 results in an arcuate translation of the first portion 120 of the second element 116 about the pivot axis 124. To provide for both upward and downward pivotal movement from a chordwise plane, the second element 116 is oriented with its second portion 121 extending horizontally or in a chordwise plane when the first portion 120 is in the middle of its range of arcuate movement about pivot axis 124, as shown in FIGS. 14 and 15. This orientation corresponds to that described previously with respect to FIGS. 5 and 10, and upward and downward pivotal movement is achieved by rotation of the connective gears in appropriate directions, in the same manner described previously with respect to the application of the linkage structure 13 to rearwardly extending flaps.

In the present modification, the linkage 113 includes additional, successively connected linkage elements 117, 118, and 119. To accommodate the respective linkage elements to the rear of the elements 116, 117, 118, the first or rear portion of each intermediate linkage element 116, 117, 118 is of approximately cylindrical configuration rather than tapering, frustoconical configuration as in the case of the first portion 18 of the elongated member 17 of FIG. 2. The second or forward portion of each element, e.g., 121, 143, 144, then can be rotatably mounted within corresponding rearwardly open chambers formed within the rear portions of each element forward of a respective succeeding element. At the rear ends of the second, third, and fourth linkage elements 116, 117, and 118 are respectively installed second, third, and fourth pairs of connecting gears 145, 146, 147 which are rotatable about respective pivot axes coincident with second, third, and fourth hinge or pivot axes 150, 151, 152 between the airfoil segments 111–111A, 111A–111B, and 111B–111C, respectively. The linkage elements 116, 117, 118, and 119 are initially oriented, when the airfoil segments 111, 111A, 111B, and 111C are aligned on a chordwise, generally horizontal plane, with their respective first and second axes (122, 123) lying in common planes parallel to the chordwise plane, as has been discussed with respect to the first and second elements 115, 116 with reference to FIG. 14, but the second portion axes (e.g., 123) of each successive element 116, 117, 118, and 119, are canted in opposite spanwise directions.

In operation, therefore, the linkage elements of the linkage 113 are rotatably engaged by the connecting gears 137, 138, and 145, 146, and 147 in such a manner that rotation of any of the elements results in simultaneous axial rotation of the other elements, with successive elements rotating in opposite directions. Thus, each successive pair of elements, along with the associated bearing structures and connecting gears, comprises a linkage structure operable in the same manner as has been described with respect to the linkage structure 13 of FIGS. 2 and with reference to FIGS. 3–12. That is, the first and second elements 115, 116 act as a linkage structure for causing relative pivotal movement of the associated airfoil 110 and airfoil segment 111 about pivot axis 124, the second and third elements 116, 117 comprise a linkage structure for causing relative pivotal movement of the airfoil segments 111 and 111A about pivot axis 150, and so on.

While actuation of the linkage 113 is suitably accomplished by employing respective actuating motors, not shown, directly and drivingly engaged with one or more of the connecting gears 137, 145, 146, 147, it alternatively is suitably accomplished in the present embodiment through a single actuating gear 154 mounted on a spanwise drive shaft 155 and engaged with a corresponding bevel gear 156 formed circumferentially on the forward end of the first linkage element 115. Operation is suitably accomplished by means of a drive motor or the like with suitable reduction gearing, not shown, drivingly connected to the drive shaft 155 as in the previously described embodiments. Rotation of the first element 115 for 180 degrees in a clockwise rotational direction as viewed looking rearwardly from the fixed airfoil portion 110, and as indicated by the arrow 157, results in a downward pivotal translation of the first airfoil segment 111, and incremental, additional downward pivotal movements of each of the successive segments 111A, 111B, and 111C with respect to the respective preceeding segments, resulting in the downwardly cambered orientation represented at 160 in FIG. 15. Rotation for 180 degrees in the opposite direction produces the upwardly cambered configuration represented at 161 of FIG. 15. In use, the linkage 113 is employed in combination with at least one additional set of pivotal connecting means, not shown, between the segments 110, 111, 111A, 111B, and 111C and spaced in a spanwise direction from the linkage 113 for constraining the segments 110, 111, 111A, 111B, and 111C from non-pivotal relative movement. As in the embodiments previously described, these may comprise sets of conventional hinge connectors, not shown, or additional linkages corresponding to the linkage 113 and connected for synchronous movement therewith.

Because of the previously discussed advantages achieved by the several linkage structures of the linkage 113 (the linkage structures comprising respective, adjacent pairs of the linkage elements) the linkage 113 is a practicable means for producing gradual and variable camber of a large portion of an airfoil. The advantages inherent in the present approach include the rugged construction of the resultant airfoil 101, the minimizing of play or slop between adjacent airfoil segments, and the high degree of mechanical advantage provided by the relatively long, horizontal lever arms of the linkage elements. While gradual curvature is thus successfully imparted to a large portion of the variable geometry airfoil 101, the linkage 113 minimizes vibrational and structural problems normally inherent in such multi-segment airfoils.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. Apparatus for causing controlled, relative pivotal movement of first and second structures, about a pivot axis, within a range extending between first and second extremes of pivotal movement, the apparatus being spaced along the pivot axis from at least one means pivotally connecting the first and second structures, and comprising:

an elongated member having a first portion, having a longitudinal axis, extending within the first structure and a second portion, having a longitudinal axis, extending within the second structure, the axes of the first and second portions of the elongated member being mutually skewed by an angle $\theta$ less than 90°;

first bearing means, rotatably mounting the member first portion within the first structure, for permitting rotational movement of the member about the axis of its first portion relative to the first structure but preventing yaw, and pitch, of the member relative to the first structure, the member being positioned with the junction of the axes of its first and second portions coincident with the pivot axis;

a housing extending within the second structure, second bearing means being provided for permitting rotation of the housing within the second structure about an axis intersecting the pivot axis at its intersection with the axes of the member first and second portion and for preventing yaw, and pitch, of the housing from its rotational axis relative to the second structure, the housing having a chamber open toward the pivot axis and receiving the second portion of the member, third bearing means being provided for permitting rotation of the member within the housing chamber about the axis of the member second portion and preventing yaw, and pitch, of the member relative to the housing, the rotational axis of the member within the housing being canted from the rotational axis of the housing within the second structure by an angle equal to the angle by which the axis of the member first portion is skewed from the axis of the member second portion; and means for rotating the member upon the first bearing means, and for rotating the housing upon the second bearing means at an equal rotational velocity but in an opposite direction, the axes of the first and second portions of the member and the rotational axis of the housing lying in a single plane upon the first and second structures being positioned in the first and, alternatively, the second extreme of pivotal movement.

2. The apparatus of claim 1, the axes of the first and second portions of the member and the rotational axis of the housing lying in a single plane perpendicular to the pivot axis of the two structures upon the first and second structures being positioned in the first, and alternatively, the second extreme of pivotal movement, whereby the first and second structures are caused to pivot 4 $\theta$ ° upon the member and the housing being rotated 180° from a position in which they lie within said single plane.

3. The apparatus of claim 1, the first and second structures comprising adjacent segments of an airfoil.

4. The apparatus of claim 1, the at least one means pivotally connecting the first and second structures comprising at least one other apparatus for causing relative pivotal movement of the first and second structures.

5. The apparatus of claim 1, the second structure comprising an aircraft wing and the first structure comprising a movable airfoil structure contiguous with and extending rearwardly from the wing.

6. The apparatus of claim 1, the second structure comprising a fixed portion of an aircraft wing and the first structure comprising a movable airfoil structure contiguous with and extending forwardly from the wing.

7. The apparatus of claim 1, the first bearing means comprising a first bearing journalling the first portion of the member and another bearing journalling the first portion of the member and spaced between the first bearing and the second member portion, the second bearing means comprising a third bearing journalling the housing second portion and a fourth bearing journalling the housing second portion and spaced between the third bearing and the first member portion, and the third bearing means comprising a fith bearing journalling the second portion of the member and a sixth bearing journalling the second portion of the member and spaced between the fifth bearing and the member first portion.

8. A variable camber airfoil, comprising:
a first segment;
a second segment;
means for causing controlled, relative pivotal movement of the first and second segments, about a pivot axis, within a range extending between first and second extremes of pivotal movement, at least one means pivotally connecting the first and second segments being provided, the means for causing relative pivotal movement of the segments being spaced along the pivot axis from the means pivotally connecting the segments and comprising:
an elongated member having a first portion, having a longitudinal axis, extending within the first segment and a second portion, having a longitudinal axis, extending within the second segment, the axes of the first and second portions of the elongated member having mutually skewed by an angle $\theta$ less than 90°;
first bearing means, rotatably mounting the member first portion within the first segment, for permitting rotational movement of the member about the axis of its first portion relative to the first segment but preventing yaw, and pitch, of the member relative to the first segment, the member being positioned with the junction of the axes of its first and second portions coincident with the pivot axis;
a housing extending within the second segment, second bearing means being provided for permitting rotation of the housing within the second segment about an axis intersecting the pivot axis at its intersection with the axes of the member first and second portions and for preventing yaw, and pitch, of the housing from its rotational axis relative to the second segment, the housing having a chamber open toward the pivot axis and receiving the second portion of the member, third bearing means being provided for permitting rotation of the member within the housing chamber about the axis of the member second portion and preventing yaw, and pitch, of the member relative to the housing, the rotational axis of the member within the housing being canted from the rotational axis of the housing within the second segment by an angle equal to the angle by which the axis of the member first portion is skewed from the axis of the member second portion; and
means for rotating thhe member upon the first bearing means, and for rotating the housing upon the second bearing means at an equal rotational velocity but in an opposite direction, the axes of the first and second portions of the member and the rotational axis of the housing lying in a single plane upon the first and second structures being positioned in the first and, alternatively, the second extreme of pivotal movement.

9. Apparatus for causing pivotal movement of first and second structures about a pivot axis, the strutures being connected by at least one means pivotally connecting the structures, the apparatus being spaced along the pivot axis from the connecting means and comprising:
an elongated member having a first axial portion, a first bearing means positionally fixed relative to the first structure and comprising a means for receiving the member first portion, the member having a second axial portion whose axis is skewed from the axis of the first member portion by an angle $\theta$ less than 90° and whose axis intersects the axis of the first member portion at the pivot axis of the structures;
an axial housing, second bearing means being provided positionally fixed relative to the second structure, the second bearing means receiving and permitting axial rotation of the housing upon an axis fixed relative to the second structure and continuously intersecting the junction of the pivot axis of the two structures and the axes of the first and second member portions during relative pivotal movement of the two structures; the housing having a socket open toward the pivot axis for receiving the second portion of the member;
third bearing means, positionally fixed relative to the housing and rotatably mounting the member within the socket, for permitting rotation of the member, about the axis of its second portion, relative to the housing, the rotational axis of the member within the housing being canted from the rotational axis of the housing relative to the second structure by an angle equal to the angle by which the axis of the member first portion is skewed from the axis of the member second portion; and means for rotating the member upon the first bearing means, and for rotating the housing upon the second bearing means at an equal rotational velocity but in an opposite direction, the axes of the first and second portions of the member and the rotational axis of the housing lying in a single plane upon the first and second structures being positioned in a first, and alternatively, a second extreme of pivotal movement.

* * * * *